(12) United States Patent
Morris et al.

(10) Patent No.: US 10,822,999 B2
(45) Date of Patent: Nov. 3, 2020

(54) SYSTEMS AND METHODS FOR FAN BLADE DE-ICING

(71) Applicant: UNITED TECHNOLOGIES CORPORATION, Farmington, CT (US)

(72) Inventors: Robert J. Morris, Portland, CT (US); Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 107 days.

(21) Appl. No.: 16/044,268

(22) Filed: Jul. 24, 2018

(65) Prior Publication Data
US 2020/0032670 A1    Jan. 30, 2020

(51) Int. Cl.
| | | |
|---|---|---|
| *F01D 25/02* | (2006.01) | |
| *F01D 5/28* | (2006.01) | |
| *F02K 3/06* | (2006.01) | |
| *H05B 6/10* | (2006.01) | |

(52) U.S. Cl.
CPC .............. *F01D 25/02* (2013.01); *F01D 5/28* (2013.01); *F02K 3/06* (2013.01); *H05B 6/102* (2013.01); *F05D 2220/323* (2013.01); *F05D 2240/24* (2013.01); *F05D 2270/20* (2013.01); *F05D 2270/303* (2013.01); *F05D 2270/311* (2013.01); *F05D 2270/313* (2013.01); *F05D 2270/334* (2013.01); *F05D 2270/42* (2013.01); *F05D 2270/807* (2013.01); *F05D 2300/133* (2013.01); *F05D 2300/1616* (2013.01); *F05D 2300/17* (2013.01); *F05D 2300/2263* (2013.01); *F05D 2300/2284* (2013.01); *F05D 2300/603* (2013.01); *F05D 2300/611* (2013.01)

(58) Field of Classification Search
CPC ..... A01D 5/18; A01D 25/02; F05D 2300/611; H05B 6/102; F04D 29/582
See application file for complete search history.

(56) References Cited

U.S. PATENT DOCUMENTS

| | | | | |
|---|---|---|---|---|
| 2,205,543 | A * | 6/1940 | Rideau | B64D 15/12 244/134 D |
| 2,701,092 | A * | 2/1955 | Henshaw | F02C 7/047 219/635 |
| 5,746,580 | A * | 5/1998 | Parker | B64D 41/007 416/245 R |
| 7,323,667 | B2 * | 1/2008 | Dooley | F04D 29/584 219/630 |

(Continued)

FOREIGN PATENT DOCUMENTS

| | | |
|---|---|---|
| DE | 426057 | 3/1926 |
| DE | 19528862 | 2/1997 |

(Continued)

OTHER PUBLICATIONS

European Patent Office, European Search Report dated Oct. 23, 2019 in Application No. 19188202.6.

*Primary Examiner* — Ninh H. Nguyen
(74) *Attorney, Agent, or Firm* — Snell & Wilmer L.L.P.

(57) ABSTRACT

An anti-ice arrangement for a gas turbine engine may comprise an engine static structure, a fan blade housed for rotation within the engine static structure, and a magnetic field source mounted in close proximity to the fan blade and configured for inducing eddy currents in the fan blade to increase a surface temperature of the fan blade.

19 Claims, 8 Drawing Sheets

(56) References Cited

U.S. PATENT DOCUMENTS

| | | | |
|---|---|---|---|
| 8,033,789 B2* | 10/2011 | Read | F01D 5/26 |
| | | | 416/230 |
| 9,140,187 B2 | 9/2015 | Ribarov et al. | |
| 9,638,044 B2* | 5/2017 | Gieras | B64D 15/12 |
| 2005/0276696 A1* | 12/2005 | LeMieux | F03D 7/02 |
| | | | 416/61 |
| 2010/0065541 A1* | 3/2010 | Henze | B64D 15/12 |
| | | | 219/202 |
| 2011/0225975 A1 | 9/2011 | Pereira et al. | |
| 2012/0256676 A1 | 2/2012 | Poisson | |
| 2015/0068216 A1* | 3/2015 | Exnowski | F01D 5/08 |
| | | | 60/779 |
| 2015/0833863 | 3/2015 | Karthauser et al. | |
| 2015/0303369 A1 | 10/2015 | Haden et al. | |
| 2016/0353523 A1 | 12/2016 | Jarvinen | |
| 2019/0309653 A1* | 10/2019 | Perez | F04D 29/526 |

FOREIGN PATENT DOCUMENTS

| | | |
|---|---|---|
| EP | 2919555 | 9/2015 |
| GB | 629764 | 9/1949 |
| GB | 689901 | 4/1953 |

* cited by examiner

SYSTEMS AND METHODS FOR FAN BLADE DE-ICING

FIELD

The present disclosure relates to anti-ice systems for aircraft structures, and more specifically, to anti-ice systems for gas turbine engine fan blades.

BACKGROUND

An airplane may be propelled by one or more power plants each comprising a gas turbine engine housed in a nacelle. Each power plant is typically attached to the airplane by a pylon generally situated under a wing or at the fuselage. In other embodiments the engine is integrated into the airframe structure and forgoes the nacelle.

Icing of aircraft external components during adverse ambient flight conditions is a well-known aerodynamic problem.

Anti-ice approaches have been developed in the past, including both on-ground treatments and in-flight anti-icing. One solution for de-icing aircraft external surfaces is based on electrical resistive heating. Another solution for de-icing aircraft external surfaces is based on using hot pressurized air bleed from a predetermined compressor stage of the engine.

SUMMARY

An anti-ice arrangement for a gas turbine engine is disclosed, comprising an engine static structure, a fan blade housed for rotation within the engine static structure, and a magnetic field source mounted in close proximity to the fan blade and configured for inducing eddy currents in the fan blade to increase a surface temperature of the fan blade.

In various embodiments, rotation of the fan blade about an engine central longitudinal axis relative to the magnetic field source induces the eddy currents.

In various embodiments, the magnetic field source is disposed at least one of radially outward from a tip of the fan blade, radially inward from a root of the fan blade, or aft of the fan blade.

In various embodiments, the anti-ice arrangement further comprises a splitter dividing a core flow path and a bypass flow path, wherein the magnetic field source is mounted in the splitter.

In various embodiments, the magnetic field source is a permanent magnet having a continuously induced magnetic field.

In various embodiments, the anti-ice arrangement further comprises a tailored resistance coating disposed on the fan blade, wherein the resistance coating is configured to increase heat generated by the eddy currents through the tailored resistance coating.

In various embodiments, the tailored resistance coating is disposed on a leading edge of the fan blade, a suction side of the fan blade, and/or a pressure side of the fan blade.

In various embodiments, the anti-ice arrangement further comprises a tailored resistance coating disposed on the fan blade, wherein the resistance coating is configured to increase heat generated by the eddy currents through the tailored resistance coating.

In various embodiments, the magnetic field source is an electromagnet, the anti-ice arrangement further comprising a power electronics in electronic communication with the electromagnet and a controller in electronic communication with the power electronics, wherein the controller selectively commands an electric power supplied to the electromagnet via the power electronics in response to an input received by the controller.

In various embodiments, the input corresponds to an ambient air temperature, an ambient air humidity, and/or a fan blade speed.

In various embodiments, the controller commands the electric power supplied to the electromagnet in response to determining whether icing conditions are favorable based upon a calculated unheated fan blade surface temperature.

In various embodiments, the input corresponds to a vibration.

In various embodiments, the controller commands the electric power supplied to the electromagnet in response to detecting an imbalance generated by asymmetric ice shedding from fan blade via the vibration.

In various embodiments, the anti-ice arrangement further comprises a second magnetic field source mounted in close proximity to the fan blade and configured for inducing eddy currents in the fan blade to increase the surface temperature of the fan blade, wherein the magnetic field source is a passive magnet, and the second magnetic field source is an electromagnet.

A method for anti-ice control is disclosed, comprising sensing, by a controller, an ambient air temperature, sensing, by the controller, an ambient air humidity, estimating, by the controller, a forward aircraft speed, estimating, by the controller, a fan blade speed, calculating, by the controller, a fan blade surface temperature, determining, by the controller, if icing conditions are favorable, and commanding, by the controller, power on to an electromagnet in response to the icing conditions being determined favorable.

In various embodiments, the method further comprises commanding, by the controller, power off to the electromagnet in response to the icing conditions being determined unfavorable.

In various embodiments, the method further comprises detecting, by the controller, a non-zero rotor speed.

In various embodiments, the method further comprises determining, by the controller, that an aircraft is flying through visible water comprising at least one of rain or cloud droplets.

In various embodiments, the method further comprises determining, by the controller, that the fan blade temperature is less than or equal to 0° C. (32° F.).

A method for anti-ice control is disclosed, comprising receiving, by a controller, a vibration sensor signal, detecting, by the controller, an imbalance generated by asymmetric ice shedding from a fan blade via the vibration sensor signal, and commanding, by the controller, power on to an electromagnet in response to icing conditions being determined favorable.

In various embodiments, the electromagnet is mounted in close proximity to the fan blade and configured for inducing eddy currents in the fan blade to increase a surface temperature of the fan blade in response to the power being commanded by the controller.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
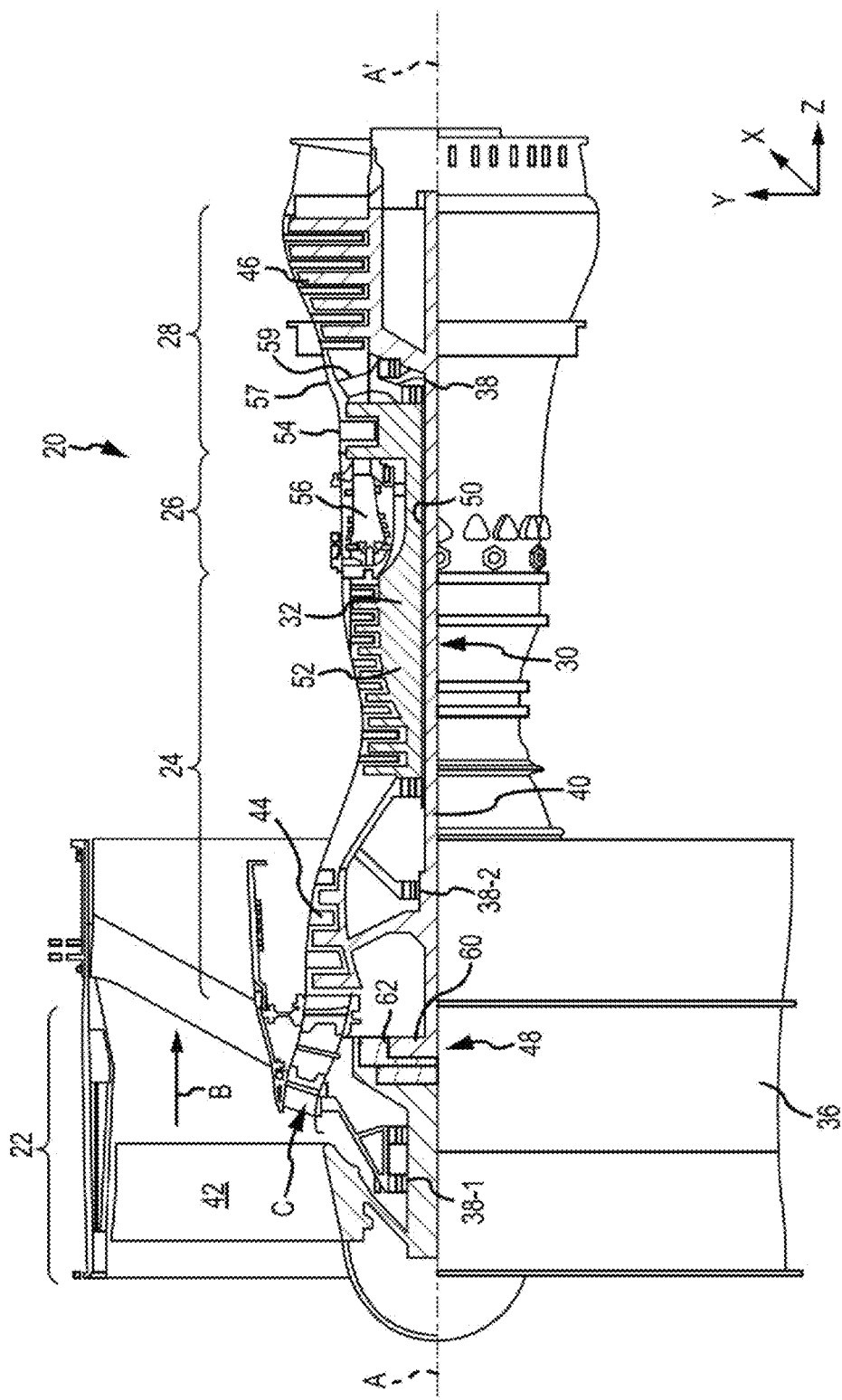
FIG. 1 illustrates a schematic view of a gas turbine engine, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials. In some cases, reference coordinates may be specific to each figure.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

Systems and methods for anti-ice control for a fan blade are disclosed herein. An anti-ice arrangement may include a magnet in close proximity to a fan blade for generating eddy currents in the fan blade which consequently heats the fan blade via induction heating. The magnet may be stationary with respect to the engine static structure. The term "anti-ice" typically refers to the prevention of ice formation, while the term "de-ice" typically refers to the controlled shedding of ice already formed. As used herein, the terms "anti-ice" and "de-ice" are used interchangeably and are meant to cover both the prevention of ice formation and/or the controlled shedding of ice already formed, depending on the implementation details.

In various embodiments, the magnet is a permanent magnet which induces eddy currents in the fan blade in response to the fan blade moving with respect to the magnets.

In various embodiments, the magnet is an electromagnet which receives electric power from a power source via power electronics and is selectively powered via a controller. In various embodiments, the controller may utilize ambient conditions for determining the risk of ice forming on the fan blade to determine when to power on the anti-ice arrangement and/or to vary the intensity of the magnetic field.

In various embodiments, the controller utilizes a vibration sensor to detect ice being shed from the fan blade to determine when to power on the anti-ice arrangement and/or to vary the intensity of the magnetic field.

In various embodiments, a tailored resistance coating may be formed onto the fan blade for selectively generating more heat to that portion of the fan blade which is covered with the resistance coating. In this manner, locations of the fan blade at which ice accretion is anticipated may be selectively targeted for elevated heat generation.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive coolant (e.g., air) along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclical gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
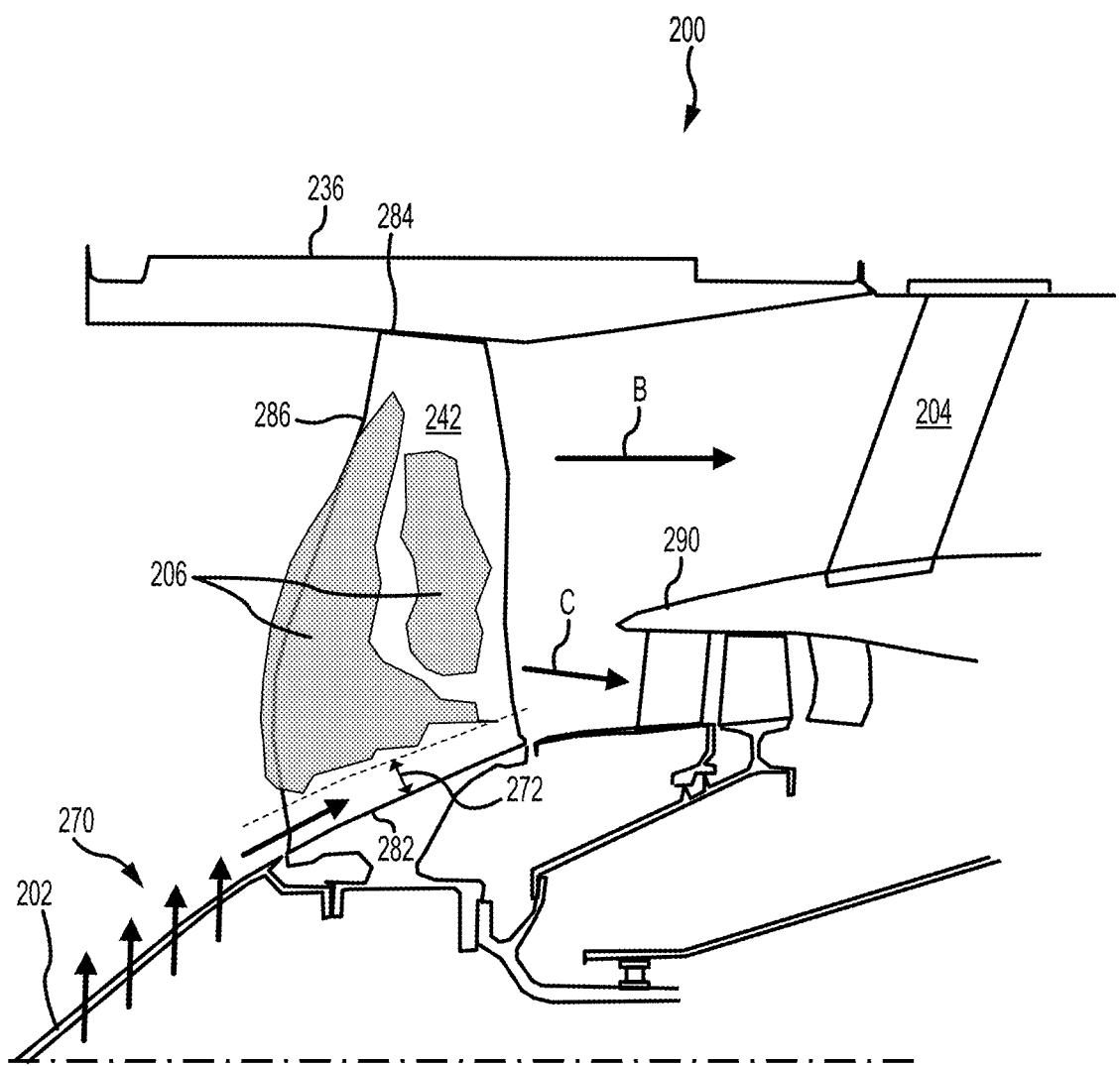
FIG. 2 illustrates a schematic view of a fan section of the gas turbine engine in use and under icing conditions, in accordance with various embodiments.

With reference to FIG. 2, a cross-section view of a forward end of a gas turbine engine 200 having accreted ice formed on fan blade 242 during icing conditions is illustrated, in accordance with various embodiments. Gas turbine engine 200 may include a nose cone (also referred to as a spinner) 202 connected for rotation with a central shaft of the engine (e.g., low speed spool 30 of FIG. 1). Nose cone 202 may be connected for rotation with fan blade 242. In operation, inlet air entering gas turbine engine 200 may be directed radially outward from splitter 290 along bypass flow-path B or radially inward from splitter 290 along core flow-path C. In various embodiments, a fan exit guide vane 204 may be disposed in bypass flow-path B and extend between engine static structure 236 and splitter 290. In various embodiments, engine static structure 236 may be a fan case.

In various embodiments, nose cone 202 may be in fluid communication with a compressor section of gas turbine engine 200 for receiving warm air 270. In use, warm air 270 enters the nose cone 202 and, due to the pressure of the warm air 270 inside the nose cone being greater than the ambient air outside of the nose cone, the warm air 270 is expelled from the nose cone 202 for de-icing the nose cone 202 and/or the fan blade 242. Due to the air flowing into the inlet of the gas turbine engine 200, the warm air 270 may tend to form a film of warm air along the surfaces of the nose cone 202 and may tend to de-ice at a root section, illustrated at arrow 272, of fan blade 242. Stated differently, fan blade 242 may comprise a root 282 and a tip 284. Warm air 270 may tend to de-ice at only that portion of fan blade 242 at the root section 282, as illustrated by root section 272. In various embodiments, root section 272 may be that portion of fan blade 242 extending from root 282 that is less than twenty-five percent of the total length of fan blade 242, and in various embodiments, that is less than fifteen percent of the total length of fan blade 242, and in various embodiments, that is less than ten percent of the total length of fan blade 242, wherein the total length of fan blade 242 is the average radial distance between the root 282 and tip 284.

Because air entering gas turbine engine 200 tends to force warm air 270 from traveling radially outward towards the tip 284 of fan blade 242, ice 206 may tend to form on fan blade 206 during icing conditions (e.g., depending on atmospheric conditions). Ice 206 may tend to accumulate towards the leading edge 286 of fan blade 242 between tip 284 and root 282. Ice 206 may tend to accumulate radially outward from root section 272. In this regard, it may be desirable to provide additional heating to these regions of fan blade 242 to prevent ice accretion.

Figure 3:
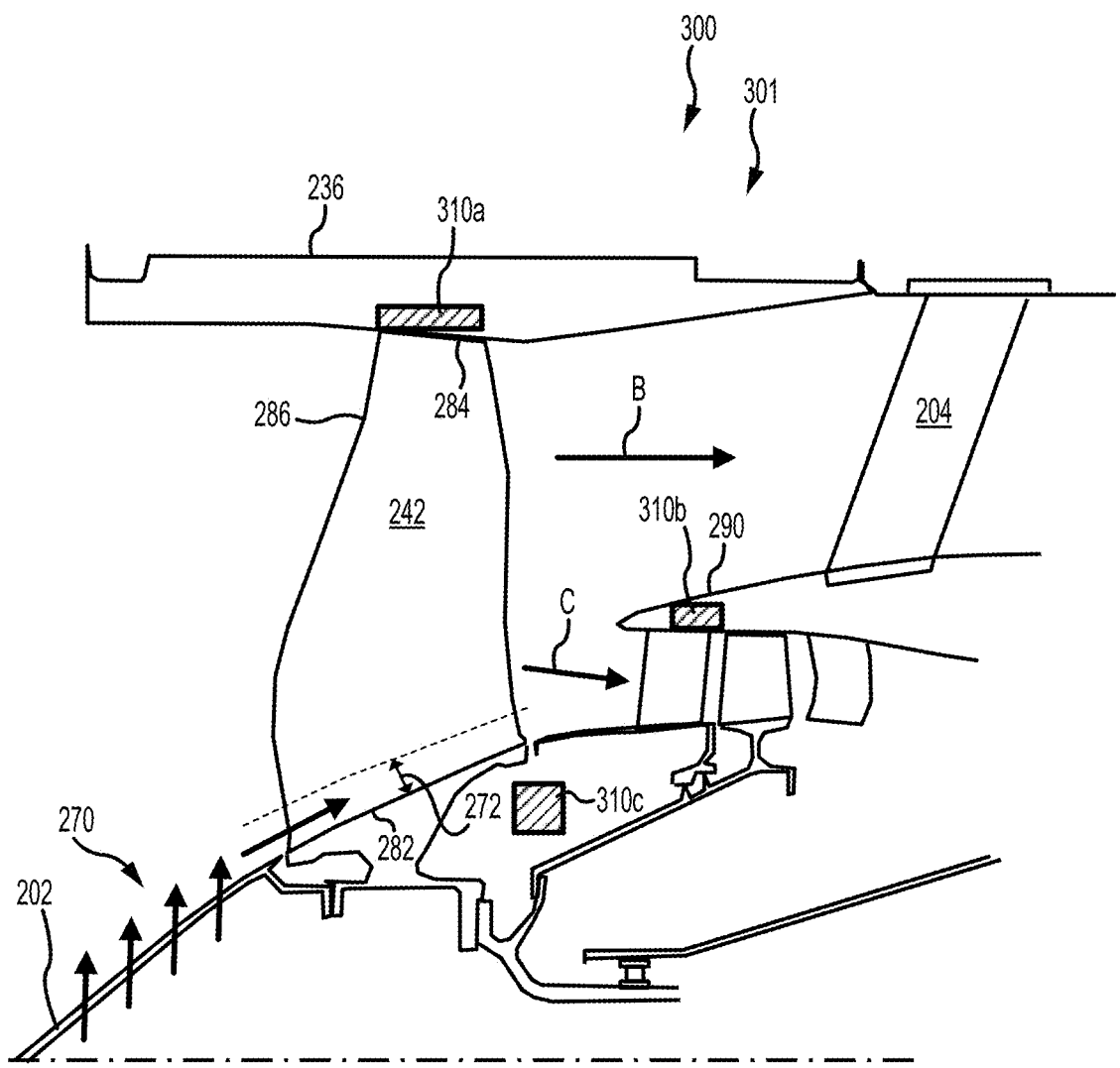
FIG. 3 illustrates a schematic view of an anti-ice arrangement comprising a passive magnet for the gas turbine engine, in accordance with various embodiments.

With reference to FIG. 3, an anti-ice arrangement 301 for a gas turbine engine 300 is illustrated, in accordance with various embodiments. Anti-ice arrangement 301 may include one or more magnetic field sources (magnets) 310*a*, 310*b*, 310*c*. Although illustrated in FIG. 3 as having magnet 310*a*, magnet 310*b* and magnet 310*c*, it is contemplated herein that anti-ice arrangement 301 may comprise only one of the magnets 310*a*, 310*b*, 310*c* or any combination of the magnets 310*a*, 310*b*, 310*c*.

In various embodiments, anti-ice arrangement 301 may include magnet 310*a* mounted to engine static structure 236. Magnet 310*a* may be mounted within engine static structure 236. Magnet 310*a* may be disposed radially outward from tip 284 of fan blade 242. Magnet 310*a* may be radially aligned with fan blade 242. Fan blade 242 may rotate with respect to magnet 310*a*.

In various embodiments, anti-ice arrangement 301 may include magnet 310*b* mounted to splitter 290. Magnet 310*b* may be mounted within splitter 290 so as to not influence the aerodynamic performance of splitter 290. Magnet 310b may be disposed aft of fan blade 242. In this regard, fan blade 242 may rotate with respect to magnet 310b.

In various embodiments, anti-ice arrangement 301 may include magnet 310c mounted radially inward from fan blade 242. Magnet 310c may be mounted to a fixed structure of gas turbine engine 300. Magnet 310c may be disposed radially inward of root 282 of fan blade 242. Fan blade 242 may rotate with respect to magnet 310c.

In various embodiments, magnets 310a, 310b, 310c may be passive magnets, such as permanent magnets having continuously induced magnetic fields. Stated differently, magnets 310a, 310b, 310c may be configured for passive induction heating to fan blade 242 via eddy currents. In this regard, magnets 310a, 310b, 310c may be iron-based magnets, or rare-earth based magnets, such as neodymium based magnets for example. Magnets 310a, 310b, 310c may be configured to heating fan blade 242 sufficient to minimize ice accretion without compromising the structural integrity of fan blade 242. In various embodiments, magnets 310a, 310b, 310c may be configured for increasing the surface temperature of fan blade 242 by approximately 50° F.

Figure 4:
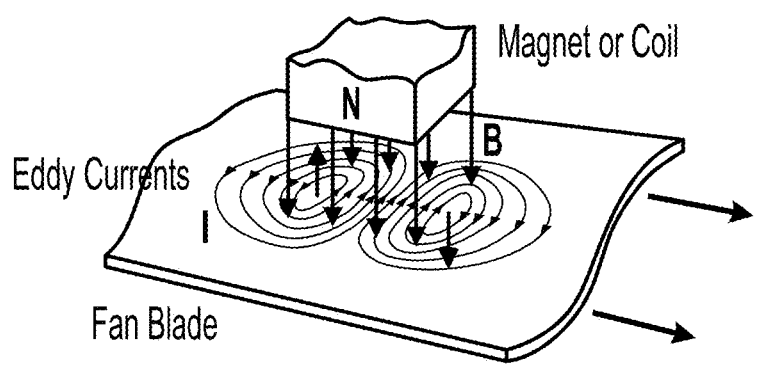
FIG. 4 illustrates a magnet generating eddy currents in a fan blade, in accordance with various embodiments.

With momentary reference to FIG. 4, eddy currents may be currents which circulate in conductors like swirling eddies in a stream. They may be induced by changing magnetic fields and flow in closed loops, perpendicular to the plane of the magnetic field. They can be created when a conductor is moving through a magnetic field, or when the magnetic field surrounding a stationary conductor is varying—i.e. anything which results in the conductor experiencing a change in the intensity or direction of a magnetic field can produce eddy currents. The size of the eddy current may be proportional to the size of the magnetic field, the area of the loop and the rate of change of magnetic flux, and inversely proportional to the resistivity of the conductor. The heating effect originates from the transformation of electric energy into heat energy and may be referred to as induction heating. The resistance felt by the eddy currents in a conductor may cause Joule heating and the amount of heat generated may be proportional to the current squared.

In this regard, with reference again to FIG. 3, magnets 310a, 310b, 310c may be disposed in close proximity to fan blade 242 such that the magnetic field of magnets 310a, 310b, 310c induces eddy currents in fan blade 242. Rotation of fan blade 242 relative to the magnets 310a, 310b, 310c may induce the eddy currents. For example, splitter 290 may be extended forward such that magnet 310b is close enough to fan blade 242 for induction heating. Furthermore, magnets 310a, 310b, 310c may be positioned such that their respective magnetic fields are directed towards fan blade 242.

Figure 5:
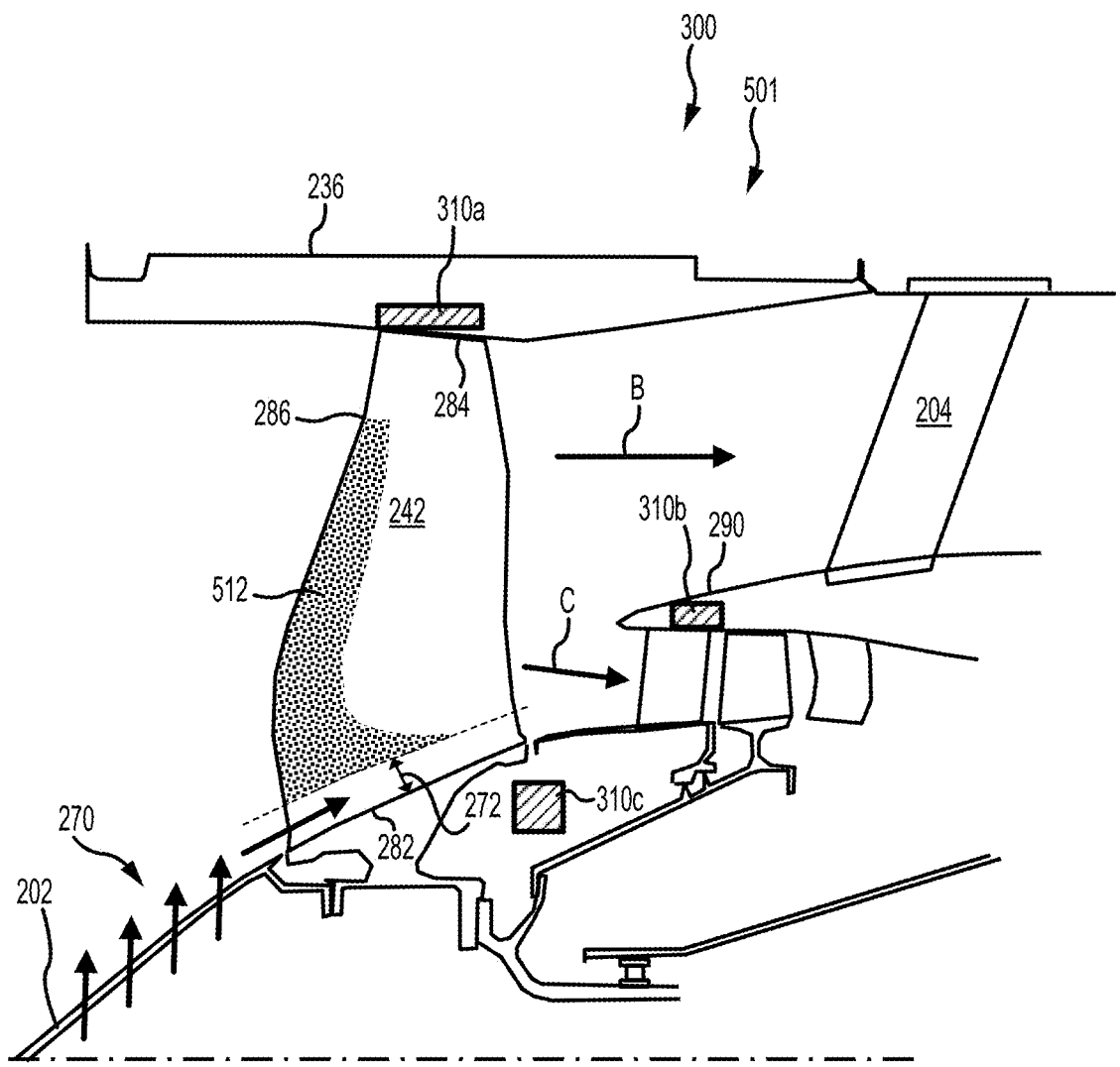
FIG. 5 illustrates a schematic view of the anti-ice arrangement of FIG. 3 further comprising a tailored resistance coating on the fan blade, in accordance with various embodiments.

With reference to FIG. 5, an anti-ice arrangement 501 for a gas turbine engine 300 is illustrated, in accordance with various embodiments. Anti-ice arrangement 501 may be similar to anti-ice arrangement 301 of FIG. 3, except that anti-ice arrangement 501 further comprises a tailored resistance coating 512. Resistance coating 512 may comprise a resistivity which is greater than the material of fan blade 242. In this regard, resistance coating 512 may increase the surface resistance of fan blade 242, thereby increasing the heat generated by a given magnetic field in the locations of resistance coating 512.

In various embodiments, fan blade 242 may comprise a titanium fan blade. In various embodiments, fan blade 242 may comprise a composite fan blade, such as a carbon-fiber composite fan blade. In various embodiments, resistance coating 512 may comprise various materials for tailoring the resistivity of resistance coating 512. In various embodiments, for a titanium fan blade 242, contemplated coating materials include titanium nitride, chrome carbide, tungsten carbide, and nickel alloys, among others. In various embodiments, for a composite fan blade 242, contemplated coating materials include zinc, tungsten-carbide cobalt, and electroless nickel, among others. Resistance coating 512 may comprise alumina or other ceramic materials. However, resistance coating 512 may comprise any suitable conductive material for tailoring the resistivity of the resistance coating to selectively provide desired heating for anti-ice control to desired locations of fan blade 242. Resistance coating 512 may comprise a monolithic singular layer material or a multi-layer, multi-material stack depending on desired electrical properties. The location and properties of resistance coating 512 may be selected based on the desired zone of possible ice accretion, as well as the location and relative strength of the magnetic field inducing the eddy currents. Depending on the coating, application could be via electron-beam physical vapor deposition (EB-PVD), plasma spray, high velocity oxygen fuel (HVOF) spraying, electroplating, or other coating methods.

In various embodiments, resistance coating 512 may be disposed along the leading edge of fan blade 242. Resistance coating 512 may be disposed on the pressure side, towards the leading edge of fan blade 242. Resistance coating 512 may be disposed on the suction side, towards the leading edge of fan blade 242. In various embodiments, resistance coating 512 may be disposed radially outward from root section 272. Resistance coating 512 may be disposed in a pre-determined location where ice accretion is anticipated for increased induction heating.

Figure 6:
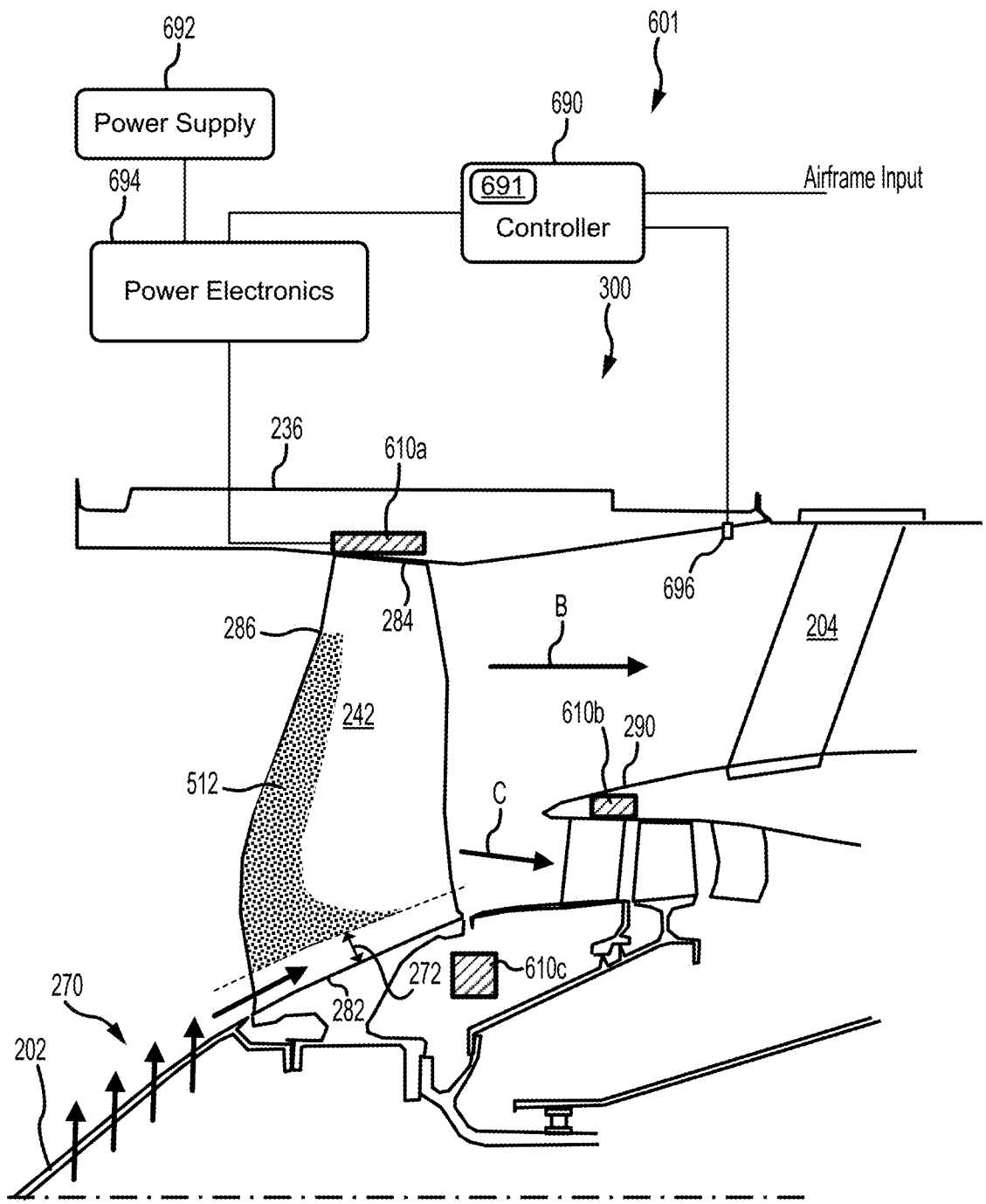
FIG. 6 illustrates a schematic view of an anti-ice arrangement comprising an active magnet for the gas turbine engine, in accordance with various embodiments.

Having discussed various anti-ice arrangements which utilize passive magnets for eddy current heating, FIG. 6 illustrates an anti-ice arrangement 601 which utilizes active magnetic field sources (electromagnets) for eddy current heating. Although illustrated in FIG. 6 as having electromagnet 610a, electromagnet 610b and electromagnet 610c, it is contemplated herein that anti-ice arrangement 601 may comprise only one of the electromagnets 610a, 610b, 610c or any combination of the electromagnets 610a, 610b, 610c. Furthermore, it should be understood that any combination of magnets 310a, 310b, 310c or electromagnets 610a, 610b, 610c may be implemented, with momentary combined reference to FIG. 5 and FIG. 6. For example, a combination of permanent magnets and electromagnets (i.e., a mixed passive and controlled system) may be implemented, in accordance with various embodiments.

Anti-ice arrangement 601 may include a controller 690. Controller 690 may comprise a non-transitory, tangible computer-readable medium 691. System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Anti-ice arrangement 601 may include a power supply 692 supplying power to power electronics 694. In various embodiments, power supply 692 may comprise a battery, a capacitor, a generator, or the like. In various embodiments, power supply 692 may comprise an existing power supply for gas turbine engine 300. Power electronics 694 may comprise power electronics configured for conditioning a power signal suitable for electromagnet 610a. In various embodiments, power electronics 694 may comprise a frequency generator for control of the magnetic field strength. Although illustrated as being connected to electromagnet 610a for clarity purposes, power electronics 694 may also be connected to electromagnet 610b and electromagnet 610c.

In various embodiments, controller 690 may receive input from an airframe (e.g., pilot inputs, temperature sensor inputs, humidity sensor inputs, etc.) for controlling electromagnets 610a, 610b, 610c.

Figure 7A:
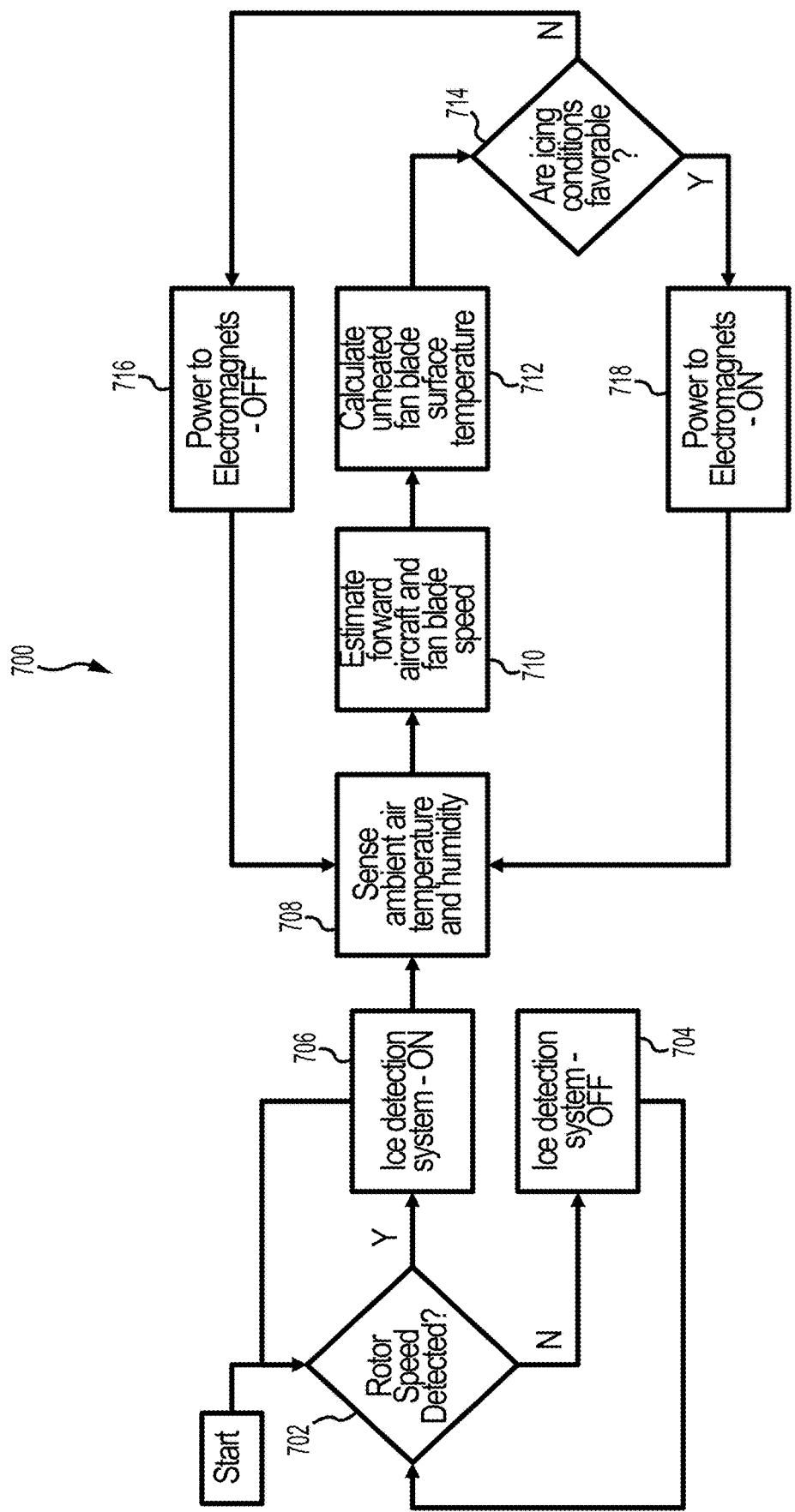
FIG. 7A illustrates a flow chart for a method for anti-ice control for a fan blade, in accordance with various embodiments.

With combined reference to FIG. 6 and FIG. 7A, a method 700 for anti-ice control is provided, in accordance with various embodiments. Method 700 includes detecting a non-zero rotor speed (step 702). Step 702 may include detecting a rotational speed corresponding to the rotational speed of fan blade 242. If the non-zero rotor speed is not detected, an ice detection system—e.g., anti-ice arrangement 601—may be powered off (or may remain off if the ice detection system was previously powered off) (step 704). In response to the non-zero rotor speed being detected the ice detection system may be powered on (step 706). Step 706 may include executing, by controller 690, instructions stored in non-transitory, tangible computer-readable medium 691 for determining whether or not to power on electromagnets 610a, 610b, 610c. Said instructions may include sensing ambient air temperature and humidity (step 708). Step 708 may include receiving, by controller 690, ambient air temperature and humidity from corresponding sensors—e.g., via the airframe input. Said instructions may include estimating forward aircraft speed and fan blade speed (step 710). Step 710 may include estimating, by controller 690, the forward aircraft speed and the speed of fan blade 242. Said instructions may further include calculating unheated fan blade surface temperature (step 712). Step 712 may include calculating, by controller 690, the surface temperature of fan blade 212 under the assumption that no outside heat is being applied to fan blade 212. The surface temperature calculation may be based on the forward aircraft speed, the speed of fan blade 242, the ambient air temperature, and the ambient air humidity. Furthermore, it is contemplated herein that step 712 may include measuring, by controller 690, the surface temperature of fan blade 212 via a temperature sensor, including via an infrared (IR) camera, among other temperature sensing devices. In this regard, the term, "calculating," by controller 690, the surface temperature of fan blade 212 may include both calculations based on forward aircraft speed, the speed of fan blade 242, the ambient air temperature, and the ambient air humidity, as well as calculations based on sensor feedback. Said instructions may further include determining if icing conditions are favorable (step 714). Step 714 may include determining, by controller 690, the likelihood of ice accretion on fan blade 242. In response to controller 690 determining that icing conditions are unfavorable, power to electromagnets 610a, 610b, 610c is shut off (step 716) and the instructions are continuously executed at a pre-determined rate in a closed loop fashion until the icing conditions become favorable. In response to controller 690 determining that icing conditions are favorable, electromagnets 610a, 610b, 610c are powered on (step 718) and the instructions are continuously executed at a pre-determined rate in a closed loop fashion until the icing conditions become unfavorable, as illustrated in FIG. 7A.

Figure 7B:
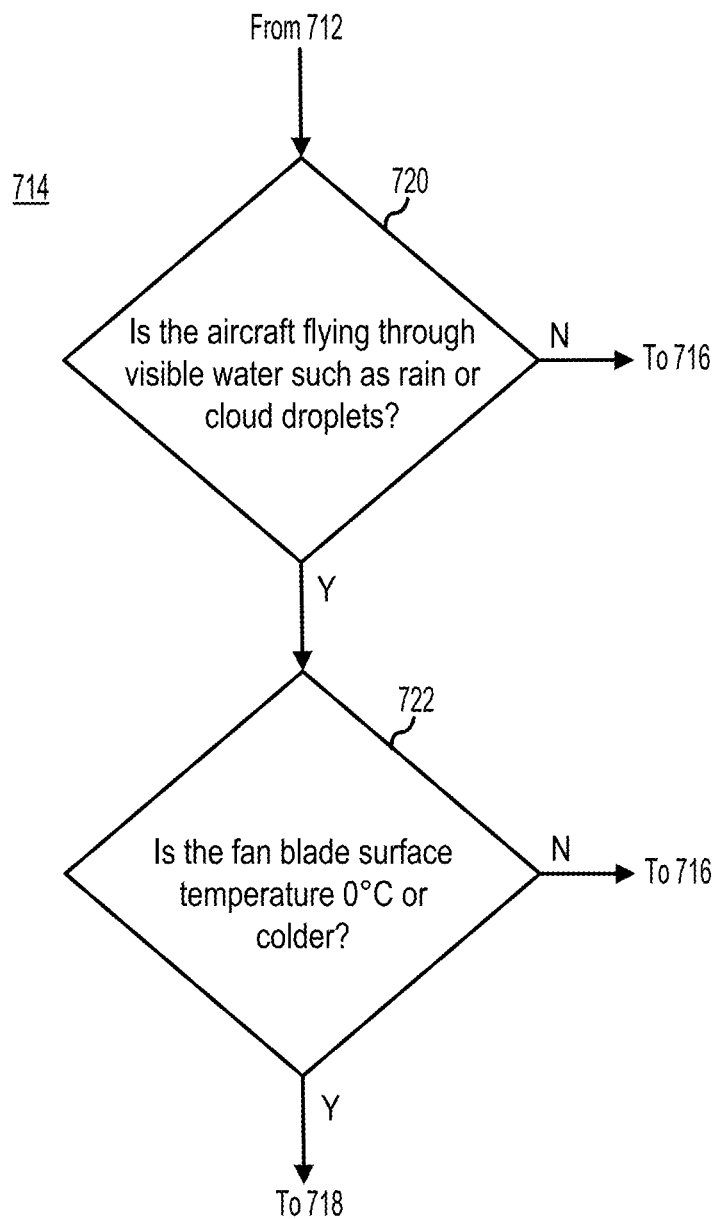
FIG. 7B illustrates a method for determining the favorability of icing conditions, in accordance with various embodiments.

In various embodiments, with combined reference to FIG. 7A and FIG. 7B, step 714 may include detecting whether the aircraft is flying through visible water such as rain or cloud droplets (step 720). Step 714 may be determined based on a sensor input or based on a pilot input. Controller 690 may determine that the icing conditions are unfavorable in response to the controller 690 detecting that the aircraft is not flying through visible water. In various embodiments, step 714 may include determining if the fan blade surface temperature is less than 0° C. (32° F.) (step 720). Controller 690 may determine that the icing conditions are unfavorable in response to the controller 690 detecting that the fan blade surface temperature is greater than 0° C. (32° F.). However, controller 690 may determine that icing conditions are favorable in response to the controller detecting the aircraft flying through visible water such as rain or cloud droplets and the controller detecting the fan blade surface temperature is less than 0° C. (32° F.).

In various embodiments, various atmospheric conditions may be taken into account when determining the favorability of icing conditions (i.e., the risk of icing accretion), such as those provided in table 1 below:

TABLE 1

| Icing Risk | | | |
| Icing Risk | | | |
| Cumulous Clouds | Stratiform Clouds | Rain and Drizzle | Risk |
|---|---|---|---|
| 0° to −20° C. (32° to −4° F.) | 0° to −15° C. (32° to 5° F.) | 0° C. and below (32° F. and below) | High |
| −20° to −40° C. (−4° to −40° F.) | −15° to −30° C. (5° to −22° F.) | — | Medium |
| <−40° C. (<−40° F.) | <−30° C. (<−22° F.) | — | Low |

For example, in various embodiments, the strength of the magnetic field may be controlled based on the level of risk (i.e., high, medium, or low) in accordance with table 1.

With reference again to FIG. 6, in various embodiments, controller 690 may receive input from a vibration sensor 696 for controlling electromagnets 610a, 610b, 610c. Vibration sensor 696 may be mounted aft of fan blade 242. Vibration sensor 696 may be mounted to engine static structure 236. Vibration sensor 696 may be in fluid communication with bypass flow path B. Controller 690 may detect, via input from vibration sensor 696, imbalance generated by asymmetric ice shedding from fan blade 242. In this regard, controller 690 may power on electromagnets 610a, 610b, 610c in response to the imbalance of fan blade 242 being detected via vibration sensor 696. In various embodiments, vibration sensor 696 may be a pressure sensor, an accelerometer, or any other suitable sensor for detecting vibration.

Figure 8:
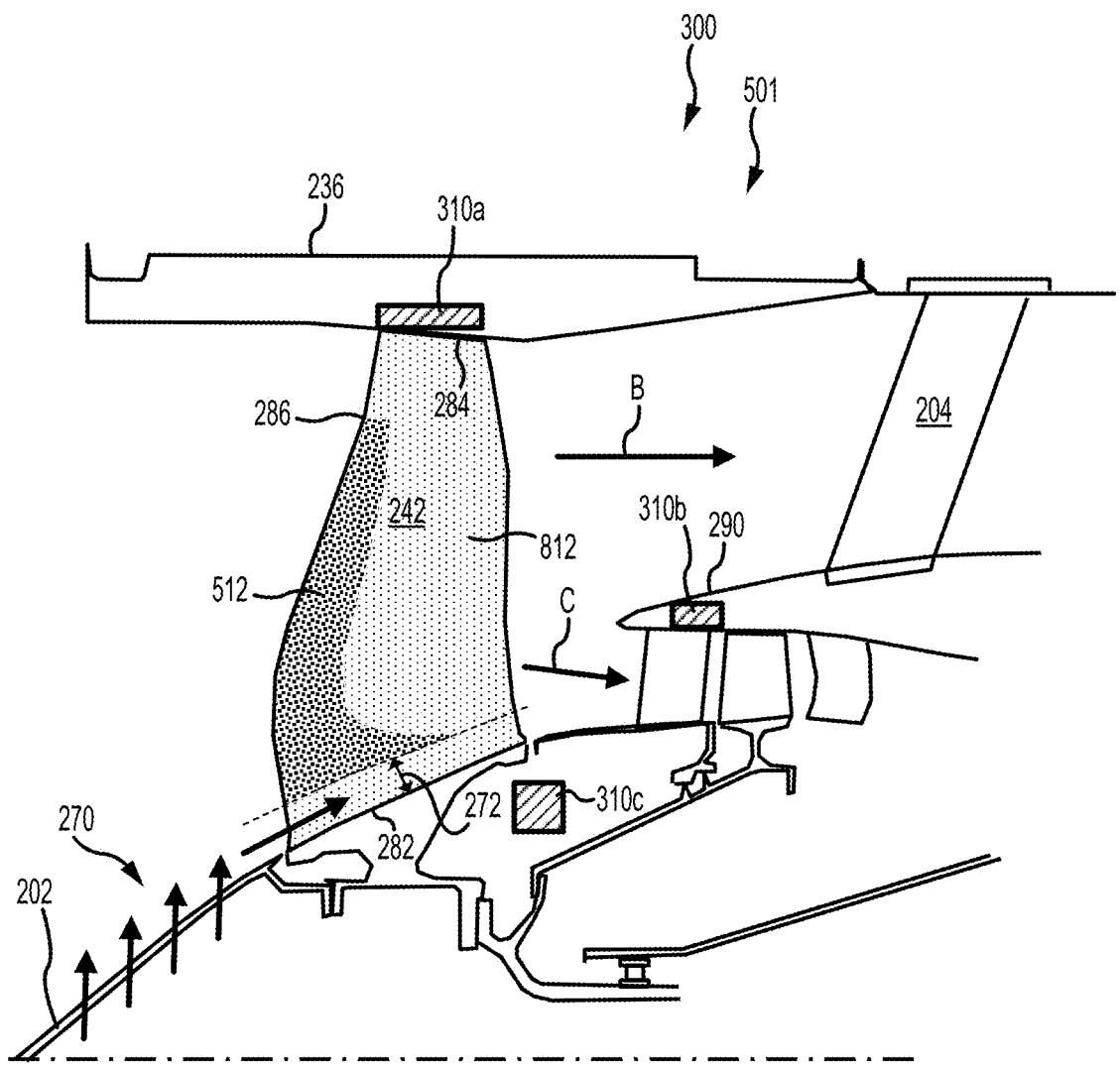
FIG. 8 illustrates a schematic view of the anti-ice arrangement of FIG. 5 further comprising a second tailored resistance coating on the fan blade, in accordance with various embodiments.

With respect to FIG. 8, elements with like element numbering, as depicted in FIG. 5, are intended to be the same and will not necessarily be repeated for the sake of clarity.

With reference to FIG. 8, it is contemplated herein that a resistance coating may be provided for either increased resistance (low conductivity) or decreased resistance (high conductivity). In this regard, the term "tailored resistance" as used herein may refer to a coating having a resistance which is either greater than or less than that of blade 242. For example, in contrast to resistance coating 512 of FIG. 5, in various embodiments, a resistance coating 812 may comprise a material having a resistivity which is less than that of the material of fan blade 242. In this regard, resistance coating 812 may decrease the surface resistance of fan blade 242, thereby decreasing the heat generated by a given magnetic field in the locations of resistance coating 512. Resistance coating 812 may prevent blade 242 from overheating or may concentrate surface currents towards locations of decreased resistance (i.e., towards resistance coating 512).

In various embodiments, resistance coating 812 may be disposed at the root of fan blade 242. In various embodiments, resistance coating 812 may be disposed towards the trailing edge of fan blade 242. In various embodiments, resistance coating 812 may be disposed at the tip of fan blade 242. In various embodiments, resistance coating 812 may be disposed on the suction side and/or the pressure side of fan blade 242.

In various embodiments, resistance coating 512 may be referred to herein as a first tailored resistance coating and resistance coating 812 may be referred to herein as a second tailored resistance coating. Fan blade 242 may comprise solely resistance coating 512, solely resistance coating 812, or both resistance coating 512 and resistance coating 812, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An anti-ice arrangement for a gas turbine engine, comprising:
    an engine static structure;
    a fan blade housed for rotation within the engine static structure;
    a magnetic field source mounted in close proximity to the fan blade and configured for inducing eddy currents in the fan blade to increase a surface temperature of the fan blade; and
    a tailored resistance coating disposed on the fan blade, wherein the resistance coating is configured to at least one of increase or decrease heat generated by the eddy currents through the tailored resistance coating.

2. The anti-ice arrangement of claim 1, wherein rotation of the fan blade about an engine central longitudinal axis relative to the magnetic field source induces the eddy currents.

3. The anti-ice arrangement of claim 2, wherein the magnetic field source is disposed at least one of radially outward from a tip of the fan blade, radially inward from a root of the fan blade, or aft of the fan blade.

4. The anti-ice arrangement of claim 3, further comprising a splitter dividing a core flow path and a bypass flow path, wherein the magnetic field source is mounted in the splitter.

5. The anti-ice arrangement of claim 1, wherein the magnetic field source is a permanent magnet having a continuously induced magnetic field.

6. The anti-ice arrangement of claim 1, wherein the tailored resistance coating is disposed on at least one of a leading edge of the fan blade, a suction side of the fan blade, and a pressure side of the fan blade.

7. The anti-ice arrangement of claim 1, wherein the magnetic field source is an electromagnet, the anti-ice arrangement further comprising:
    a power electronics in electronic communication with the electromagnet; and
    a controller in electronic communication with the power electronics, wherein the controller selectively commands an electric power supplied to the electromagnet via the power electronics in response to an input received by the controller.

8. The anti-ice arrangement of claim 7, wherein the input corresponds to at least one of:
    an ambient air temperature;
    an ambient air humidity;
    a fan blade speed; or
    a vibration.

9. The anti-ice arrangement of claim 8, wherein the controller commands the electric power supplied to the electromagnet in response to determining whether icing conditions are favorable based upon a calculated unheated fan blade surface temperature.

10. The anti-ice arrangement of claim 9, wherein the controller commands the electric power supplied to the electromagnet in response to detecting an imbalance generated by asymmetric ice shedding from the fan blade via the vibration.

11. The anti-ice arrangement of claim 1, further comprising a second magnetic field source mounted in close proximity to the fan blade and configured for inducing eddy currents in the fan blade to increase the surface temperature of the fan blade;
   wherein the magnetic field source is a passive magnet; and
   the second magnetic field source is an electromagnet.

12. The anti-ice arrangement of claim 1, further comprising a second tailored resistance coating disposed on the fan blade,
   wherein the tailored resistance coating is configured to increase heat generated by the eddy currents through the tailored resistance coating, and
   the second resistance coating is configured to decrease heat generated by the eddy currents through the tailored resistance coating.

13. A method for anti-ice control, comprising:
   sensing, by a controller, an ambient air temperature;
   sensing, by the controller, an ambient air humidity;
   estimating, by the controller, a forward aircraft speed;
   estimating, by the controller, a fan blade speed;
   calculating, by the controller, a fan blade surface temperature, wherein the fan blade surface temperature is calculated based upon at least one of:
      i) a temperature sensor feedback signal; or
      ii) the ambient air temperature, the ambient air humidity, the forward aircraft speed, and the fan blade speed;
   determining, by the controller, if icing conditions are favorable based upon the fan blade surface temperature, wherein the favorability of the icing conditions corresponds to a likelihood of ice accretion on a fan blade; and
   commanding, by the controller, power on to an electromagnet in response to the icing conditions being determined favorable.

14. The method of claim 13, further comprising commanding, by the controller, power off to the electromagnet in response to the icing conditions being determined unfavorable.

15. The method of claim 13, further comprising detecting, by the controller, a non-zero rotor speed.

16. The method of claim 13, further comprising determining, by the controller, that an aircraft is flying through visible water comprising at least one of rain or cloud droplets.

17. The method of claim 13, further comprising determining, by the controller, that the fan blade temperature is less than or equal to 0° C. (32° F.).

18. A method for anti-ice control for a gas turbine engine, comprising:
   receiving, by a controller, a vibration sensor signal from a vibration sensor;
   detecting, by the controller, an imbalance generated by asymmetric ice shedding from a fan blade via the vibration sensor signal; and
   commanding, by the controller, power on to an electromagnet in response to the imbalance being detected;
   wherein the vibration sensor is mounted to an engine static structure of the gas turbine engine, and the vibration sensor comprises an accelerometer.

19. The method of claim 18, wherein the electromagnet is mounted in close proximity to the fan blade and configured for inducing eddy currents in the fan blade to increase a surface temperature of the fan blade in response to the power being commanded by the controller.

* * * * *